May 23, 1972 W. KLEIN 3,664,724
OPTICAL SYSTEM FOR STEREOSCOPIC MICROSCOPES
Filed Feb. 24, 1970

WALTER KLEIN
INVENTOR
BY Krafft + Wells
ATTORNEYS

United States Patent Office 3,664,724
Patented May 23, 1972

3,664,724
OPTICAL SYSTEM FOR STEREOSCOPIC MICROSCOPES
Walter Klein, Wissmar, Germany, assignor to
E. Leitz GmbH, Wetzlar, Germany
Filed Feb. 24, 1970, Ser. No. 13,464
Claims priority, application Germany, Mar. 1, 1969,
P 19 10 550.1
Int. Cl. G02b 21/00
U.S. Cl. 350—54                                   1 Claim

ABSTRACT OF THE DISCLOSURE

In the optical system for stereoscopic microscopes a negative lens is provided in front of the well known prism elements or mirror elements between the objective and the ocular. By means of this additional negative lens a long object distance is achieved, i.e. a long distance between the object and the front lens of the microscope. The latter, however, can still be of relatively low overall height and compact design.

BACKGROUND OF THE INVENTION

The present invention relates to a stereoscopic microscope and more particularly to a simple optical system therefor having a relatively low magnifying power.

Simple stereoscopic microscopes comprise generally the following optical groups of elements:

(1) A pair of objectives which are preferably simple achromats having a magnifying power between $0.5\times$ and $2.0\times$. These objectives may be mounted interchangeably.
(2) Prism elements and/or mirror elements which are used for image erection, and
(3) A pair of oculars which may also be mounted interchangeably Simple stereoscopic microscopes should be of compact design and their overall height should be as low as possible. On the other hand and contrary to these requirements, however, the object distance should also be as long as possible.

It is therefore an object of the present invention to provide a stereoscopic microscope which meets all these contradictory conditions.

SUMMARY OF THE INVENTION

The above stated object is attained by introducing an additional negative lens directly in front of the prism elements or mirror elements and by adjusting the magnifying power of the objectives to the total image distance. Preferably, the negative lenses are simple plano-concave lenses. The magnifying power of these lenses is between 1 and $2.5\times$.

The objectives may be interchangeable and they may be designed that they provide two different magnifying ratios of the total system when adjusted to two different positions.

It is an advantage of the optical system including the invented negative lens that the overall height of the microscope is reduced without the necessity of reducing the free object distance. A further advantage being that the prism elements or mirror elements can be designed much smaller without causing any untolerable vignetting.

BRIEF DESCRIPTION OF THE DRAWINGS

The invention will be more readily comprehended from the following description when taken in conjunction with the appending drawings, wherein.

DESCRIPTION OF THE PREFERRED EMBODIMENTS

The introduction of the negative lens results in an object distance of 170 mm. if the total magnification is $32\times$. At the same time the overall height is reduced by 38.5 millimeters as compared to the overall height of the prior art microscope.

In the following table there is provided a complete list of the data of an optical system for a stereoscopic microscope wherein the objective may be disposed in two different positions so that in one position, providing a long object distance, a total magnification of $32\times$ is achieved while in the other position a total magnification of $50\times$ is achieved. Data of the known prism elements or mirror elements are not included in the table since these elements have no influence on the state of correction of the total system. The prism elements are, of course, disposed between the invented additional negative lens and the ocular field lens.

Figure 1:
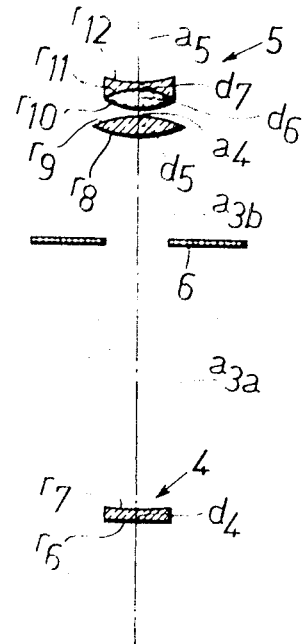
FIG. 1 shows schematically a sectional view of the total system.

TABLE
[Dimensions shown in Figure 1]

| | | | $n_e$ | $v_e$ |
|---|---|---|---|---|
| $r_1=50.209$ | $d_1=2.0$ | $a_0=170.91$ 136.55 respectively | 1.67158 | 32.76 |
| $r_2=24.764$ | $d_2=3.0$ | | 1.51872 | 63.96 |
| $r_3=86.787$ | | $a_1=65.05$ 99.41 respectively | | |
| $r_4=\infty$ | $d_3=2.0$ | | 1.5872 | 63.96 |
| $r_5=95.098$ | | $a_2=73.7$ | | |
| $r_6=\infty$ | $d_4=2.0$ | | 1.51872 | 63.96 |
| $r_7=61.006$ | | $a_{3a}=46.6$ ocular diaphragm $a_{3b}=17.9$ | | |
| $r_8=21.604$ | $d_5=3.7$ | | 1.60973 | 59.19 |
| $r_9=-21.604$ | | $a_4=0.3$ | | |
| $r_{10}=10.898$ | $d_6=3.8$ | | 1.51872 | 63.96 |
| $r_{11}=-13.051$ | $d_7=1.5$ | | 1.79190 | 25.55 |
| $r_{12}=34.058$ | | $a_5=\infty$ | | |

In the above table $r$ is the radius, $d$ is the thickness along the optical axis, $n_e$ is the refractive index, and $v_e$ is the Abbé number of the indicated lens. The symbol a represents the indicated spacing between adjacent lens elements.

To the total magnification of the example given in the above table the elements contribute as indicated below:

magnification of the ocular: $M_{oc}=25\times$
magnification of the negative lens: $M_{neg}1.6\times$
magnification of the objective: $M_{obj}=0.8\times$ and $1.25\times$
total magnification: $M_{tot}=32\times$ and $50\times$ It is a further advantage of the additional negative lens that an adjustment of the objective is readily possible. With stereoscopic microscopes it is quite common to displace the objectives along their optical axes in order to compensate for differences in their respective focal lengths (and in those of the other elements), which focal lengths must be equal to one another in order to have matching optical parts in both branches of the microscope. Due to inaccuracies in production, however, these focal lengths are not always equal so that the objectives must be displaced in order to adjust the left-hand optical path and the right-hand optical path to exactly the same image distance and to a common center on the object. The variation of the image distance from the object to the intermediate image $\Delta_L$ depends on the magnification $\beta'$ of the system and on the displacement $\Delta_V$ according to the equation:

$$\Delta_L = \Delta_V \cdot (\beta'^2 - 1)$$

From this equation it will be comprehended that an objective having a magnifying polwer of 1.0× cannot be adjusted. However, if a negative lens is additionally introduced, adjustment can be accomplished simply by displacing this lens. In the above example, wherein the magnification of the negative lens is $\beta'_{neg} = 1.6\times$, a good effect of this lens on the adjustment is obtained. Besides, the negative lens may be used as a protection against stray light and dust, since the lens is arranged directly in front of the prisms or mirrors.

The image aberrations caused by the negative lens are of a minor nature only, as the lens is a simple planoconcave lens. Such minor aberrations may be easily compensated for in known manner by the objective and/or ocular.

Figure 2:
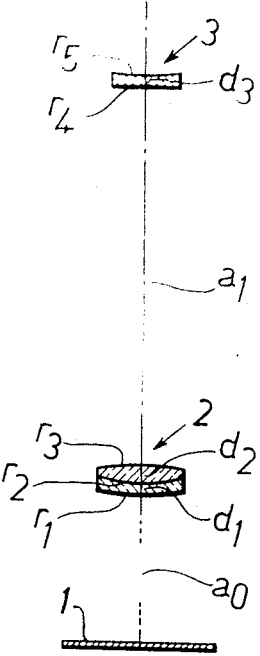
FIG. 2 shows schematically the optical system of a stereoscopic microscope with the objective on the left side in a position which gives $50\times$ total magnification and the objective on the right side in a position which gives $32\times$ total magnification.
Figure 2:
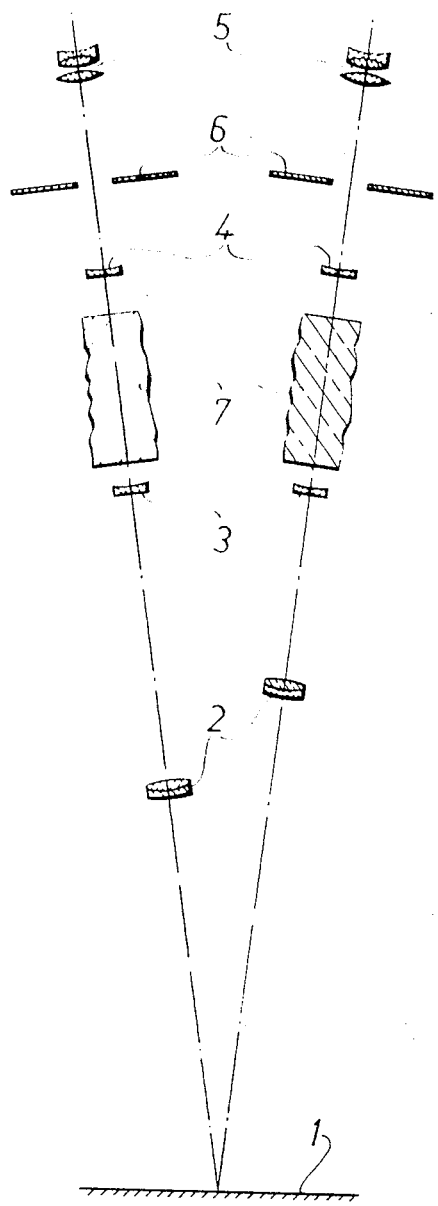

In FIG. 2 the reference numeral 1 designates the plane of the object above which the objectives 2 and the negative lens 3 are arranged. Prism elements 7 are disposed between the negative lenses 3 and the ocular field lenses 4, and an ocular diaphragm 6 is arranged in either path in the intermediate image planes between the occular field lenses 4 and the ocular 5.

What is claimed is:

1. An optical system for stereoscopic microscopes comprising:
   (a) an objective in alignment along an optical axis with
   (b) prism elements and
   (c) an ocular;
   (d) a first negative lens arranged adjacent to and in front of the prism elements in the direction of the light flux, and
   (e) a second negative lens arranged behind the prism elements in the direction of the light flux;

the refractive power of the objective being adjusted to the respective total imaging distance and wherein the radii $r$, the thicknesses along the optical axis $d$, the spacings of the lens elements $a$, the refractive indices $n_e$, and the Abbé numbers $v_e$ of the glasses are of the values given in the following table:

TABLE

[Dimensions shown in Figure 1]

| | | | $n_e$ | $v_e$ |
|---|---|---|---|---|
| | | $a_0=170.91$ 136.55 respectively | | |
| $r_1=50.209$ | $d_1=2.0$ | | 1.67158 | 32.76 |
| $r_2=24.764$ | $d_2=3.0$ | | 1.51872 | 63.96 |
| $r_3=-86.787$ | | $a_1=65.05$ 99.41 respectively | | |
| $r_4=\infty$ | $d_3=2.0$ | | 1.51872 | 63.96 |
| $r_5=95.098$ | | $a_2=73.7$ | | |
| $r_6=\infty$ | $d_4=2.0$ | | 1.51872 | 63.96 |
| $r_7=61.006$ | | $a_{3a}=46.6$ ocular diaphragm $a_{3b}=17.9$ | | |
| $r_8=21.604$ | $d_5=3.7$ | | 1.60973 | 59.19 |
| $r_9=-21.604$ | | $a_4=0.3$ | | |
| $r_{10}=10.898$ | $d_6=3.8$ | | 1.51872 | 63.96 |
| $r_{11}=-13.051$ | $d_7=1.5$ | | 1.79190 | 25.55 |
| $r_{12}=34.058$ | | $a_5=\infty$ | | |

References Cited

UNITED STATES PATENTS 3,064,532　11/1962　Lescher et al. ＿＿＿＿＿＿＿＿ 350—51
3,364,810　1/1968　Hickerson ＿＿＿＿＿＿＿＿ 350—53 UX
2,901,943　9/1959　Tackaberry ＿＿＿＿＿＿＿＿＿＿ 350—36
3,353,892　11/1967　Minns et al. ＿＿＿＿＿＿＿＿＿＿ 350—36

FOREIGN PATENTS 425,267　5/1967　Switzerland ＿＿＿＿＿＿＿＿＿＿ 350—51

DAVID SCHONBERG, Primary Examiner

T. H. KUSMER, Assistant Examiner

U.S. Cl. X.R.

350—31, 36, 48, 130